United States Patent [19]
Ross et al.

[11] Patent Number: 5,364,083
[45] Date of Patent: Nov. 15, 1994

[54] UNIVERSAL HOLDING FIXTURE END EFFECTOR

[75] Inventors: Richard G. Ross, Quarryville; George T. Gannon, Aston, both of Pa.

[73] Assignee: The Boeing Company, Seattle, Wash.

[21] Appl. No.: 148,418

[22] Filed: Nov. 8, 1993

Related U.S. Application Data

[63] Continuation of Ser. No. 32,168, Mar. 12, 1993, abandoned, which is a continuation of Ser. No. 913,467, Jul. 15, 1992, abandoned.

[51] Int. Cl.⁵ ............................................. B25B 11/00
[52] U.S. Cl. ..................................... 269/21; 269/266
[58] Field of Search ................. 269/21, 266, 309, 267; 248/362, 363, 206 R; 51/235; 294/64 R, 64 A, 64 B; 355/73

[56] References Cited

U.S. PATENT DOCUMENTS

| | | |
|---|---|---|
| 3,116,919 | 1/1964 | Alth . |
| 3,460,822 | 8/1969 | Link . |
| 3,787,039 | 1/1974 | Zeichman . |
| 3,800,741 | 4/1974 | Boulton . |
| 3,804,397 | 4/1974 | Neumann . |
| 4,006,929 | 2/1977 | Barker . |
| 4,088,312 | 5/1978 | Frosch et al. ............... 269/266 |
| 4,146,082 | 3/1979 | Granger . |
| 4,184,292 | 1/1980 | DeFazio et al. . |
| 4,221,356 | 9/1980 | Fortune ................... 269/21 |
| 4,403,567 | 9/1983 | daCosta et al. . |
| 4,470,585 | 9/1984 | Bavelloni . |
| 4,491,306 | 1/1985 | Eickhorst ................. 269/21 |
| 4,656,791 | 4/1987 | Herrington . |
| 4,684,113 | 8/1987 | Douglas et al. . |
| 4,700,488 | 10/1987 | Curti ....................... 269/21 |
| 4,723,766 | 2/1988 | Beeding . |
| 4,770,455 | 9/1988 | Collins ..................... 269/267 |
| 4,805,887 | 2/1989 | Ray . |
| 4,838,531 | 6/1989 | Corsi ....................... 269/21 |
| 5,120,033 | 6/1992 | Shoda ...................... 269/21 |

FOREIGN PATENT DOCUMENTS 117686 12/1979 Japan ............................. 269/21

*Primary Examiner*—Robert C. Watson
*Attorney, Agent, or Firm*—Jones, Tullar & Cooper

[57] ABSTRACT

A universal holding fixture for holding a workpiece of a contour having a contoured surface is described in which the workpieces supported by a plurality of vertically adjustable support rods. At the end of each support rod, a pliable bellows-shaped end effector is attached which will conform to the particular surface of the workpiece and then grasp the workpiece by means of a vacuum applied at the base of the end effector.

8 Claims, 2 Drawing Sheets

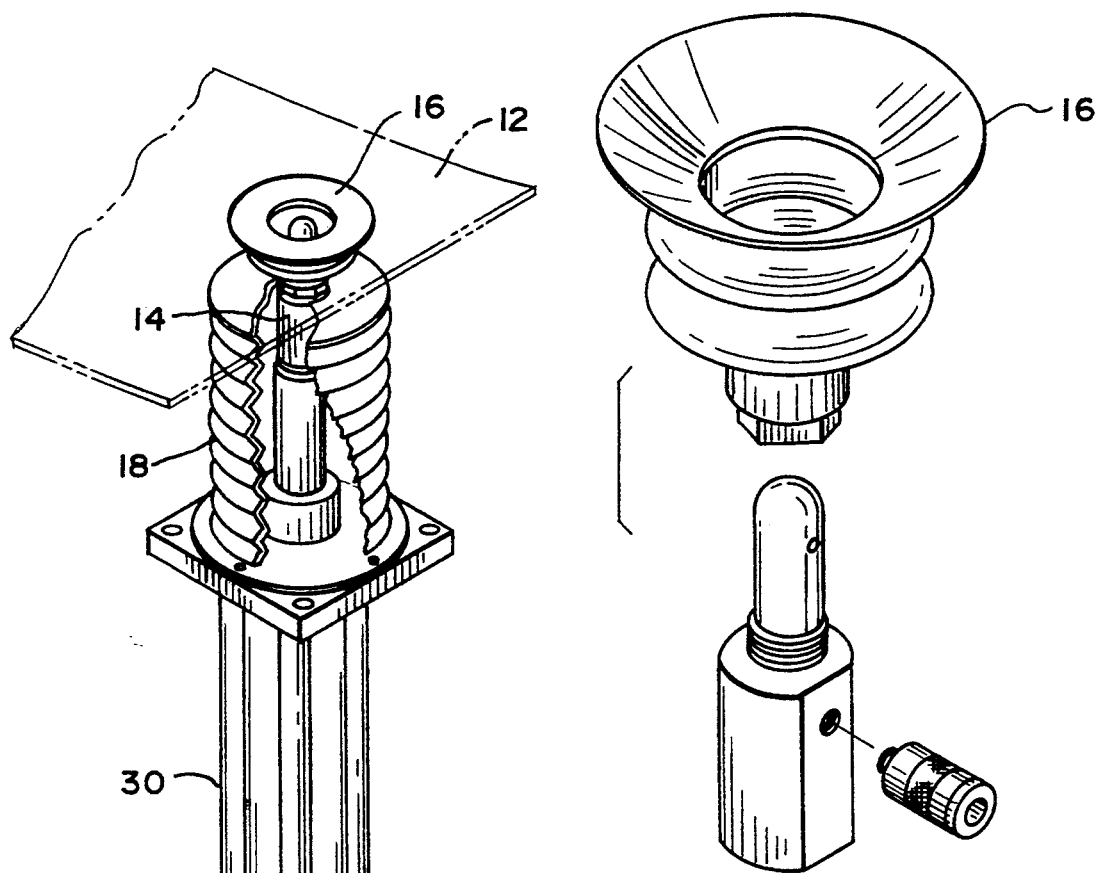
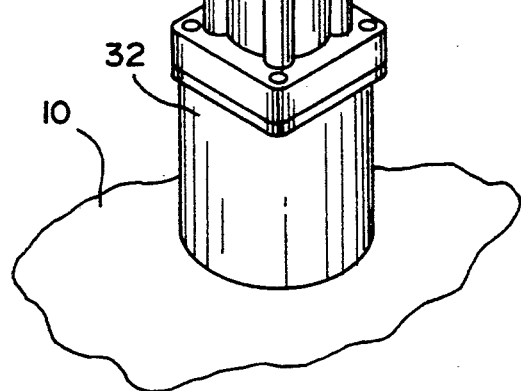
FIG. 2
FIG. 3
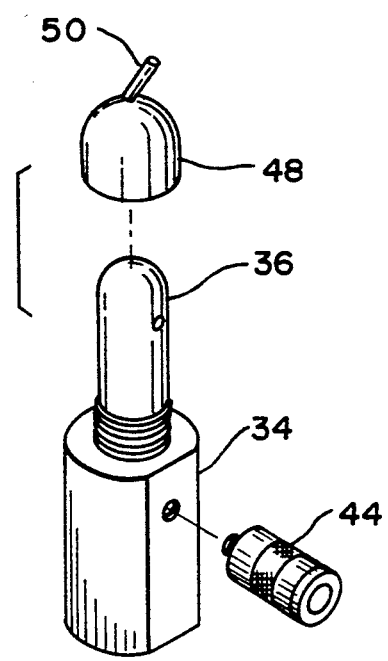
FIG. 4

UNIVERSAL HOLDING FIXTURE END EFFECTOR

This is a continuation of Ser. No. 08/032,168 filed Mar. 12, 1993, now abandoned, which is a continuation of 07/913,467 filed Jul. 15, 1992 now abandoned.

BACKGROUND OF THE INVENTION

The present invention relates generally to a tool comprising a holding fixture for holding a workpiece and in particular to a holding fixture capable of holding a variety of workpieces having varying contours on their surfaces.

In the production of contoured parts, such as contoured panels utilized in aircraft or other large structures, it is often necessary to hold a large contoured panel in order to perform machining operations on the workpiece. Typically such machining operations comprise trimming the edge of the part to a particular shape, drilling holes for attachment of other parts of the assembly or attaching other parts directly to the workpiece. In the past, it has been necessary to fabricate an individual fixture for each workpiece to be machined. This large variety of individual holding fixtures requires a large investment in fabrication and maintenance of the work fixtures and large storage areas to store the fixtures when not in use. In addition, a substantial amount of labor is required to change the holding fixture each time a new part is to be worked on. It is, therefore, desirable to have a single fixture which is adaptable to support parts of varying contours in sizes. Such a universal holding fixture is described in U.S. Pat. No. 4,684,113.

This patent discloses a universal holding fixture equipped with plurality of workpiece holding rods which can be selectively adjusted to any height within their designed range. By individually adjusting the height of these rods in a preselected pattern, the locus of the ends of the rods forms a contoured surface adapted to the particular workpiece to be held. In the prior art devices vertical adjustment of the holding rods is critical since the end effector at the end of the rod which holds the workpiece to the rod has only a limited ability to adapt to the shape of the part. Because of the accuracy required in the height adjustment the time required to set up the fixture for a particular part is substantially increased. While this holding fixture provides substantial advantages over the prior art, it is desirable to have the holding fixture more easily adaptable to various parts thus reducing the time required for set up and tear down for each different workpiece.

SUMMARY OF THE INVENTION

In the present invention a holding fixture is disclosed which contains a series of holding rods which are adjustable in height by individual actuators which may be adjusted to form generally the contour of the workpiece to be utilized. At the end of each rod, an end effector is attached which is made of a pliable impervious material such as polyurethane. This end effector is formed in a soft, vertically compressible bellows configuration which allows the end effector to adapt angularly and linearly to the workpiece to be held. Because the end effector can adapt over a wide range of contours, the accuracy in setting the height of the rod is substantially lessened. The end of the effector is formed as a bellows-shaped suction cup and a vacuum source is provided such that each support rod is secured to the workpiece by a vacuum force applied at the lower end of the end effector.

In addition, the pliable end effector may be replaced by a locating pin on the end of certain selected support rods. These pins accurately locate the workpiece on the holding fixture such that trimming and drilling or similar operations may be performed accurately by robotic arms attached as a part of the fixture. The height of the individual rods is adjusted by individual actuators controlled by a computerized control panel in which the contour of the various parts to be machined is stored. By means of a simple program, the fixture will automatically adjust each individual holding rod to the required height for the selected workpiece.

BRIEF DESCRIPTION OF THE DRAWINGS

FIG. 2 is a perspective view of a portion of the holding fixture showing details of the support rods.

FIG. 3 is an enlarged exploded view of one of the end effectors.

FIG. 4 is an exploded view of a control rod with a locating pin attached.

DETAILED DESCRIPTION OF THE PREFERRED EMBODIMENT

Figure 1:
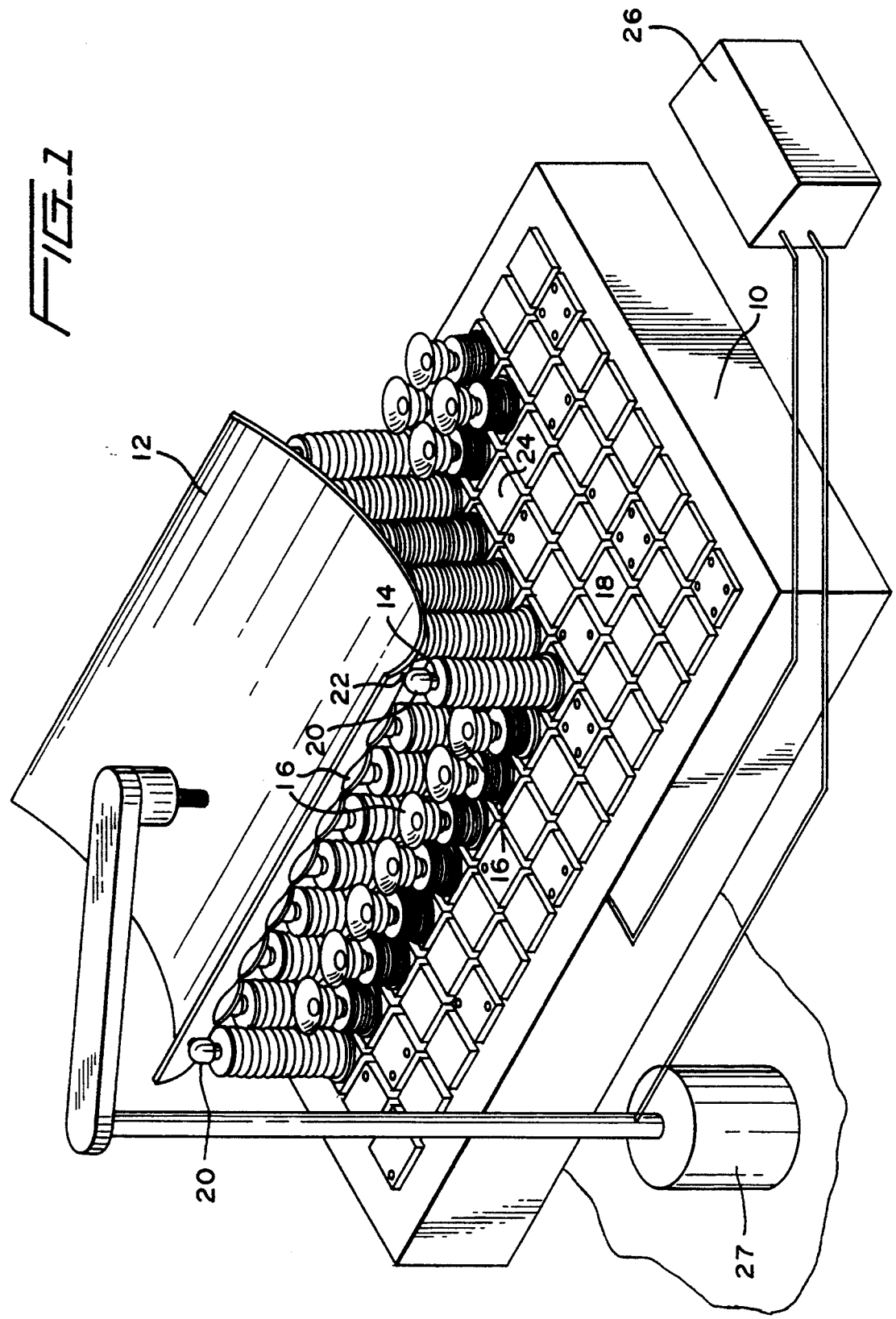
FIG. 1 is a perspective view of the holding fixture utilized in the invention.

Referring now to FIG. 1, there is shown an overall perspective view of a holding fixture according to the invention. The fixture consists of a base member 10 of generally rectangular shape which supports a plurality of holding rods 14 arranged over the surface of the base member. At the end of each of the holding rods is an end effector 16 which will be described in more detail in connection with FIGS. 2 and 3. The end effectors 16 conform to the shape of the workpiece 12 and are attached to the workpiece by means of a vacuum to be discussed in more detail in connection with FIGS. 2 and 3.

Selected support rods are provided with an alternative end as shown at rods 20 and in FIG. 4. On these rods, the end effector 16 is replaced by a locating pin assembly 22 which accurately locates the workpiece 12 on the array of support rods. Actuators not being used are shown in their retracted position at 24. A controller 26 is provided to adjust each of the control rods 14 to a preselected height determined by the contour of the workpiece 12 which is stored in the memory of the controller 26. A robotic manipulated work arm 27 is connected to the base 10 of the fixture. The robotic arm is also controlled by the controller 26 according to a pre set program for each work piece. The locating pin assembly 22 locates the workpiece accurately with respect to the robotic arm. Thus, the robotic arm, equipped with a cutter or other work tool, can perform precise machining operations on the workpiece according to the controller program.

Referring now to FIGS. 2 and 3, the support rods and end effectors are shown in more detail. Each of the control rods is supported on the base 10 by an actuator 30 which can be, for example, a ball screw actuator of any known type. Such a ball screw actuator requires a motor 32 to drive the actuator to adjust the height of the support rod 14 in response to commands from the controller. Each support rod is surrounded by a second bellows 28 to protect the mechanism from dirt and dust and from physical damage.

Referring now to FIG. 3, the end effector 38 is shown in more detail. The end effector 38 has formed at its end a suction cup surface 39 which is connected to the body of the end effector by means of a vertically compressible bellows 40. This bellows is made of a pliable, gas impervious material such as polyurethane. The end of the bellows 40 is attached to a nut 41 having internal threads in the usual manner. At the end of the support rod 14 there is attached the location member 34. This member is provided at its upper end with a location point 36 having an opening 42 therein connected to an internal chamber (not shown) within the base member 10 of the device. At the base of the location member 34 there is a threaded portion 43 for attaching the nut 41 to the end of the rod. Each of the rod ends is provided with an opening 46 which communicates with the internal chamber of the support rod and opening 42. This opening 46 is attached to a vacuum source of any known type (not shown) by means of connector 44.

In FIG. 4 the locating member 48 is shown. This adaptor has an internal opening which fits over the end of the control point 36. At its upper end the locating member 48 has a pin 50 mounted for universal movement. Pin 50 is adapted to be inserted in a locating hole in the workpiece as shown in FIG. 1.

In the operation of the device, the controller 26 is programmed according to the contour of the workpiece to be installed and the machining operation to be performed. Locating members 48 are installed on selected support rods to be inserted in locating holes in the workpiece. When the controller is actuated the selected support rods are elevated to the position determined by the contour of the workpiece 12. When all of the support rods have reached their preset position, the workpiece is installed to lie atop the end effectors 38 and is precisely located by the pins 50 on the locating support rods 20. When the workpiece has been located on the support rods a vacuum is applied at the connectors 44 of the end effectors 38 at the end of the support rods. As a vacuum is applied, the end effector 38 draws the workpiece down against its upper surface by means of the vacuum. Because of its flexible nature and vertical bellows configuration, the end effector adjusts angularly and linearly to conform to the surface of the workpiece. Since all of the support rods and end effectors are securely attached to the workpiece by the vacuum, the workpiece is fixed in the fixture and may be machined in conventional matter. When the machining has been completed the vacuum on each of the end effectors is released and the part may be then lifted from the fixture. The fixture then can immediately be reset for a part of a different contour which has been stored in the memory of the controller.

Thus as can be seen, that there is provided an end effector for a universal holding fixture which is readily adaptable to the contour of a variety of workpieces to be held. In addition, the end effector may be replaced by locating pin on certain selected support rods for accurately locating the workpiece in the fixture.

What is claimed is:

1. A holding rod for holding a workpiece comprising:
   a base member;
   a support rod, said support rod having an internal chamber and an opening in the surface of said rod, said opening communicating with the internal chamber of said rod;
   a vacuum source;
   means for connecting the internal chamber of said rod with said vacuum source;
   actuator means attached to said base member and said support rod for adjusting the height of said support rod;
   control means connected to said actuator for controlling the height of said rod according to a pre-set program; and
   a cup-shaped end effector of pliable material formed in a vertical bellows form attached to the upper end of said support rod, the internal opening of said cup-shaped vertical bellows end effector being in communication with the opening in said support rod.

2. A holding rod according to claim 1 wherein said end effector is of a gas impervious material.

3. A holding rod according to claim 2 wherein the gas-impervious material of said end effector is polyurethane.

4. A universal holding fixture for holding a workpiece comprising:
   a base member;
   a plurality of workpiece holding rods;
   a plurality of actuators, each of said actuators being attached to said base member at its lower end and to one of said holding rods at its upper end for individually adjusting the height of said rods to a predetermined height;
   control means connected to said actuators for individually controlling the height of each of said rods according to a pre-set program such that the contour formed by the upper ends of said holding rods conforms to the contour of the lower surface of the workpiece;
   first end effector means for locating said workpiece in relation to the upper ends of said holding rods;
   second end effector means for creating a holding force between said second end effectors and said workpiece, said second end effector comprising a pliable cup-shaped member formed in a vertical bellows shape, said bellows being of larger diameter at its upper end than at its lower closed end and open at its upper end and attached to the upper end of the holding rod at its lower end and a vacuum source connected to the internal opening of said cup-shaped member whereby said vacuum between the second end effector and the lower surface of the workpiece creates the holding force for holding the workpiece.

5. The universal holding fixture according to claim 4 wherein said first end effector comprises:
   an inverted cup-shaped member, said cup shape being adapted to receive the upper end of said selected holding rods;
   a locating pin attached to the upper surface of said inverted cup-shaped member for universal movement thereon, said pin being adapted to be inserted in corresponding locating holes in said workpiece.

6. The universal holding fixture according to claim 5 wherein said holding rod is provided with an internal cavity connected to said vacuum source and an opening through the wall of said cavity and in communication with the open end of said cup-shaped member.

7. The universal holding fixture according to claim 6 wherein said cup-shaped member is of a gas impermeable material.

8. The universal holding fixture according to claim 7 wherein the gas impervious material of the cup-shaped member is made of polyurethane.

* * * * *